United States Patent
Wagner

(10) Patent No.: US 9,294,604 B1
(45) Date of Patent: Mar. 22, 2016

(54) SERIAL WRAP-AROUND REDUNDANCY SYSTEM

(71) Applicant: Charles Wagner, Hampton, NH (US)

(72) Inventor: Charles Wagner, Hampton, NH (US)

(73) Assignee: C-Marine Dynamics, Inc., Hampton, NH (US)

( * ) Notice: Subject to any disclaimer, the term of this patent is extended or adjusted under 35 U.S.C. 154(b) by 219 days.

(21) Appl. No.: 13/624,021

(22) Filed: Sep. 21, 2012

Related U.S. Application Data

(60) Provisional application No. 61/537,775, filed on Sep. 22, 2011.

(51) Int. Cl.
*G06F 15/16* (2006.01)
*H04M 1/725* (2006.01)

(52) U.S. Cl.
CPC ...... *H04M 1/72519* (2013.01); *H04M 1/72544* (2013.01)

(58) Field of Classification Search
CPC ......... H04L 45/08; H04L 45/22; H04L 43/08; H04L 43/10; H04L 12/46; H04L 29/06537; H04L 63/1408; H04B 7/15528; G06F 11/2094
USPC .................. 709/220, 223, 224, 226; 711/162; 710/38; 714/3, 4.1, 4.11, 6.22, 14, 15, 714/37, 48, 54, 749, 763; 707/654; 715/734
See application file for complete search history.

(56) References Cited

U.S. PATENT DOCUMENTS

| | | | |
|---|---|---|---|
| 6,557,062 B1 * | 4/2003 | Shaler et al. .................. | 710/110 |
| 6,728,780 B1 * | 4/2004 | Hebert .......................... | 709/239 |
| 6,973,029 B1 * | 12/2005 | Jantzen ......................... | 370/228 |
| 7,380,154 B2 * | 5/2008 | Gale et al. ..................... | 714/4.5 |
| 7,455,591 B2 * | 11/2008 | Nguyen ......................... | 463/42 |
| 7,769,862 B2 * | 8/2010 | Singh et al. ................... | 709/226 |
| 2005/0198327 A1 * | 9/2005 | Iwamura et al. .............. | 709/229 |
| 2007/0101015 A1 * | 5/2007 | Larsson et al. ................ | 709/238 |
| 2007/0217331 A1 * | 9/2007 | Khanna et al. ................ | 370/224 |
| 2008/0095085 A1 * | 4/2008 | Goodjohn ..................... | 370/310 |
| 2009/0077413 A1 * | 3/2009 | Dake et al. ........................ | 714/4 |
| 2009/0097442 A1 * | 4/2009 | Diab et al. .................... | 370/329 |
| 2011/0010560 A1 * | 1/2011 | Etchegoyen ................. | 713/189 |
| 2011/0029687 A1 * | 2/2011 | Kirrmann et al. ............ | 709/236 |
| 2012/0185553 A1 * | 7/2012 | Nelson .......................... | 709/209 |
| 2013/0007319 A1 * | 1/2013 | Decker ......................... | 710/110 |
| 2013/0145072 A1 * | 6/2013 | Venkataraghavan et al. . | 710/316 |

* cited by examiner

*Primary Examiner* — Brian J Gillis
*Assistant Examiner* — Kamran Mohammadi
(74) *Attorney, Agent, or Firm* — Mesmer & Deleault PLLC; Ross K. Krutsinger

(57) ABSTRACT

A network system includes a first data source device with a primary interface and one or more second data source devices with a secondary interface disposed in electrical communication with the first data source device. A common data source device communicates with the first data source device and the second data source device(s). A serial string with a backbone is electrically connected to the primary interface and to the secondary interface. At least one endpoint device is electrically connected to the backbone via an endpoint interface. The primary interface is constructed and arranged initially as a master communication source for the serial string. The secondary interface is constructed and arranged to monitor messages transmitted by the primary interface and to take over as the master communication source if the secondary interface does not detect messages from the primary interface after a predetermined amount of time.

21 Claims, 10 Drawing Sheets

SERIAL WRAP-AROUND REDUNDANCY SYSTEM

This application claims the benefit of U.S. Provisional Patent Application No. 61/537,775, filed Sep. 22, 2011.

BACKGROUND OF THE INVENTION

1. Field of the Invention

The invention relates to network systems, and more particularly, to a system and method of serial wrap-around redundancy.

2. Description of the Prior Art

Computer networks are communications systems that allow multiple computers and devices to be interconnected by communications channels that facilitate communications and allow sharing of resources and information among interconnected devices. The information that is shared over a computer network may be represented in a range of logical representations that differ in complexity. The Open Systems Interconnection model (OSI model) is a way of sub-dividing a communications system into smaller parts called layers. Similar communication functions are grouped into logical layers. For example, the lowest layer, known as the physical layer, defines electrical and physical specifications for devices. In particular, the physical layer defines the relationship between a device and a transmission medium, such as a copper or optical cable.

One particular physical layer standard is known as RS-485. RS-485 is a Telecommunications Industry Association (TIA)/Electronics Industry Association (EIA) standard for multipoint communications and defines the electrical characteristics of drivers and receivers for use in balanced digital multipoint systems. RS-485 is formally known as TIA/EIA-485-A (2003) and is incorporated herein by reference in its entirety. RS-485 communication is known as half-duplex, meaning that a data source device either "talks" (transmits) or "listens" (receives/monitors) a signal, but does not do both at the same time. The RS-485 standard supports several types of connectors and enables configuration of inexpensive local networks and multipoint communications links. In a multi-drop configuration, one driver is connected to, and transmits on, a "bus" of receivers, where all of the receiver components are connected to a single set (e.g., a twisted pair) of electrical wires or connectors. In multipoint networks, such as with RS-422 communication for example, multiple drivers and receivers are each connected on a single bus where any node can simultaneously transmit or receive data over multiple sets of electrical wires or connectors (e.g., two twisted pairs of wires). By utilizing a differential balanced line over twisted pair, RS-485 networks can span relatively large distances—up to 4,000 feet. The RS-485 technical standard specifies three connector pins: a first pin carries an inverting signal (−), a second pin carries a non-inverting signal (+), and a third pin carries a common reference signal or ground.

An RS-485 network is typically configured in a master-slave arrangement that includes at least one master data source device and a plurality of slave endpoint devices. Examples of data source devices include computers, network servers, and control devices having a computer processor and the ability to receive and transmit data. Endpoint devices include data loggers, access control panels and card readers, alarm system components, climate control panels, pay stations, sensors, additional computers, and the like. The data source device(s) may control, communicate data to, and/or receive data from each endpoint device. RS-485 communication enables multipoint connection of typically up to thirty-two transmitters and up to thirty-two receiver devices.

RS-485 networks configured to have redundancy have at least two master data source devices. As illustrated in FIG. 1, a traditional single-string redundant RS-485 network 20 includes a first data source device 22, a second data source device 24, and a plurality of endpoint devices 26a-26d. Each endpoint device contains two endpoint interfaces 28, 30, one for each data source device 22, 24. Each endpoint interface 28, 30 is electrically connected to a data source device. Data redundancy is provided to each endpoint 26 on the RS-485 network 20 by duplicating hardware (i.e. cabling, and endpoint interfaces) that creates separate communication paths for endpoint data.

Another technical standard is the RS-422 standard, which can communicate in full-duplex or half-duplex modes. RS-422 is formally known as TIA/EIA-422-B (2000) and is incorporated herein by reference in its entirety. A full-duplex communication protocol uses four signal pins (two inverting (−), two non-inverting (+)) plus a ground pin. In RS-422 communication, a data source device may both transmit and receive at the same time due to the extra set of pins that carry additional inverting and non-inverting signals. Thus, one pair of pins carries a transmit signal while the other pair of pins carries a receive signal. This is different from RS-485 communication, in which a data source device can either transmit or receive, but cannot do both at the same time. RS-422 communications enable multipoint configuration of typically up to five transmitters and up to ten receiver devices.

For some applications, endpoints may be located in different spaces and floors of a factory, building, or ship where the use of a single string may not be practical. In these arrangements multiple strings are utilized in order to manage overall cable lengths. For example, a traditional multi-string redundant RS-485 network 40, as seen in FIG. 2, includes a first data source device 42, a second data source device 44, and a plurality of endpoint devices 46a-46h. Each endpoint device contains two endpoint interfaces 48, 50, one for each data source device 42, 44 with each endpoint interface 48, 50 being electrically connected to a data source device. Endpoint devices 46a-46d (e.g., located on a first floor of a building) are connected to first data source device 42 via interfaces 48a-48d, respectively, as part of a first string 43a. Endpoint devices 46a-46d are also connected to second data source device 44 via interfaces 50a-50d, respectively, as part of a second string 43b. Similarly, endpoint devices 46e-46h (e.g., located on a second floor of a building) are connected to first data source device 42 via interfaces 48e-48h as part of a third string 45a. Endpoint devices 46e-46h are also connected to second data source device 44 via interfaces 50e-50h as part of a fourth string 45b.

SUMMARY OF THE INVENTION

Unfortunately, the above described conventional redundant network architectures have deficiencies. For example, by duplicating hardware in the form of additional cabling and endpoint interfaces for each endpoint, the implementation cost of setting up a redundant network can become quite expensive. This problem is further magnified when multi-string architectures are used for widely-distributed endpoints because the total length of needed additional cabling is even greater.

Another deficiency of the above-described conventional redundant network architectures is that multiple endpoint interfaces per endpoint device may give rise to network installation errors. For example, during installation a technician may inadvertently plug a particular network cable into the wrong endpoint interface of a particular endpoint device. Due to the multipoint arrangement of endpoints, a single installation error of this type could destroy redundancy and/or disrupt network communications.

In contrast to the above-described conventional redundant RS-485 architectures. The present invention is a serial wrap-around system. The serial wrap-around system of the present invention utilizes communication logic within the data source device software as well as wrap-around connections to endpoint devices to provide redundancy. These wrap-around connections provide redundancy without the added duplication of cabling and endpoint device interfaces. By removing the need for additional cabling and endpoint device interfaces, the cost of installing and maintaining a RS-485 network is greatly reduced. Additionally, by utilizing a single endpoint device interface at each endpoint, installation errors can be eliminated, such as the error of plugging a cable into the wrong interface.

One embodiment of a serial wrap-around redundancy system of the present invention is directed to a network system having a first data source device with a primary interface. The system also includes one or more second data source device(s) having a secondary interface and which is disposed in electrical communication with the first data source device. A common data source device is disposed in communication with the first data source device and each additional or second data source device. The system also includes a serial string having a serial backbone electrically connected to the primary interface of the first data source device and to the secondary interface of a second data source device. At least one endpoint device is electrically connected to the serial backbone via an endpoint interface. The primary interface is constructed and arranged initially as a master communication source for the serial string. The secondary interface is constructed and arranged to monitor messages transmitted by the primary interface and to take over as the master communication source for the serial string connected thereto if the secondary interface does not detect messages from the primary interface after a predetermined amount of time.

In another embodiment of the present invention, the secondary interface is further configured to continue monitoring messages transmitted by the primary interface after the secondary interface takes over as the master communication source. If the secondary interface detects reestablished communication from the primary interface, then the secondary interface relinquishes control as the master communication source for the serial string connected thereto.

In another embodiment of the present invention, the network system includes an additional primary interface on the first data source device and/or the second data source device and an additional secondary interface on the first data source device and/or the second data source device. An additional serial string has an additional serial backbone electrically connected to one additional primary interface and to an additional secondary interface with at least one endpoint device electrically connected to the additional serial backbone via an endpoint interface. The additional primary interface is constructed and arranged initially as a master communication source for the additional serial string. The additional secondary interface is constructed and arranged to monitor messages transmitted by the additional primary interface and to take over as the master communication source for the additional serial string if the additional secondary interface does not detect messages from the additional primary interface after a predetermined amount of time.

In another embodiment of the present invention, the first data source device is electrically connected to a front end of the serial string.

In another embodiment of the present invention, the second data source device is electrically connected to a back end of the serial string.

In another embodiment of the present invention, the primary interface, the secondary interface, and the endpoint interface are each in compliance with one of the RS-485 or RS-422 technical standards.

In another embodiment of the present invention, the backbone is a half-duplex serial backbone. In another embodiment of the present invention, the backbone is a full-duplex serial backbone.

In another embodiment of the present invention, the endpoint device(s) is (are) connected to the serial backbone in either a multi-drop configuration or a multipoint configuration.

In another embodiment of the present invention, at least one of the endpoint devices has multiple transmitters, where each transmitter is configured to communicate independently with the first data source device and the second data source device.

In another embodiment of the present invention, the endpoint device(s) is (are) electrically connected by a single endpoint interface to the serial backbone. The present invention also includes a method of network redundancy. In one step, a common data source communicates with a first data source and a second data source. In another step, a first data source communicates with at least one endpoint device connected to a serial string, where the serial string is connected to a primary interface of the first data source and to a secondary interface of the second data source. The first data source acts as a master data source for the endpoint device(s). The secondary interface monitors communication from the primary interface, which takes over as the master data source for the endpoint device(s) if the secondary interface fails to receive communication from the primary interface within a predetermined amount of time.

In another embodiment of the method, the secondary interface continues to monitor communication from the primary interface after taking over as the master data source and relinquishes control as the master data source if communication from the primary interface is reestablished.

The present invention further includes a method of configuring network redundancy that includes the step of connecting a serial backbone to a primary interface of a first data source device and to a secondary interface of a second data source device. At least one endpoint device is connected to the serial backbone via an endpoint interface, forming a serial string of endpoint devices. A common data source device is disposed in communication with the first data source device and with the second data source device. The primary interface is configured to initially act as a master communication source for the serial string of endpoint devices. The secondary interface is configured to monitor messages transmitted by the primary interface and to take over as the master communication source for the serial string of endpoint devices if the secondary interface does not detect messages from the primary interface after a predetermined amount of time.

Another embodiment of the method also includes the steps of configuring the secondary interface to continue monitoring messages transmitted by the primary interface after the secondary interface takes over as the master communication source and configuring the secondary interface to relinquish control as the master communication source for the serial string connected thereto if the secondary interface detects reestablished communication from the primary interface.

Another embodiment of the method also includes the step of connecting an additional serial backbone to an additional primary interface and to an additional secondary interface. The additional primary interface is on either the first data source device or the second data source device, and the additional secondary interface is on the other of the first data source device or the second data source device. In another step, at least one additional endpoint device is connected to the additional serial backbone via an endpoint interface to form an additional serial string of endpoint devices. In another step, the additional primary interface is configured to initially act as a master communication source for the additional serial string of endpoint devices. In another step, the additional secondary interface is configured to monitor messages transmitted by the additional primary interface and to take over as the master communication source for the additional serial string of endpoint devices if the additional secondary interface does not detect messages from the primary interface after a predetermined amount of time.

In another embodiment of the method, the first data source device is connected to a front end of the serial backbone.

In another embodiment of the method, the second data source device is connected to a back end of the serial backbone.

In another embodiment of the method, the serial backbone is either a half-duplex backbone or a full-duplex backbone.

In another embodiment of the method, the step of connecting at least one endpoint device is performed by connecting the endpoint device(s) in a multi-drop or a multipoint configuration to the additional serial backbone.

In another embodiment of the method, at least one of the endpoint devices has a plurality of transmitters and each of the plurality of transmitters is configured to communicate independently with the first data source device and the second data source device.

In another embodiment of the method, the step of connecting at least one endpoint device is performed by electrically connecting the endpoint device(s) by a single endpoint interface to the serial backbone. In another embodiment of the method, the primary interface and the secondary interface are both in compliance with the RS-485 technical standard or the RS-422 technical standard.

DETAILED DESCRIPTION OF THE PREFERRED EMBODIMENT

Figure 1:
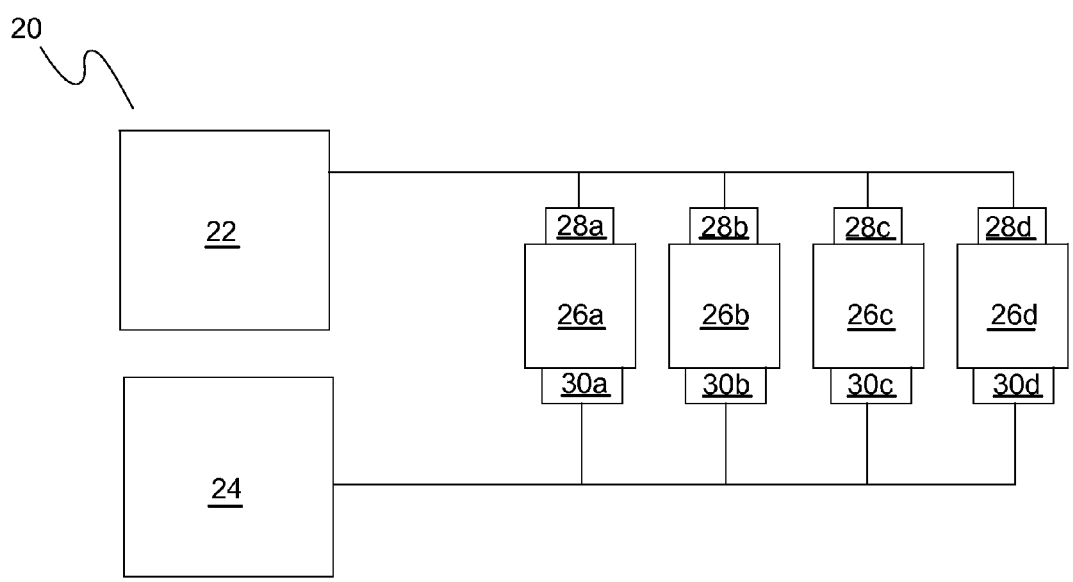
FIG. 1 is a block diagram of a single-string redundant RS-485 network of the prior art.
Figure 2:
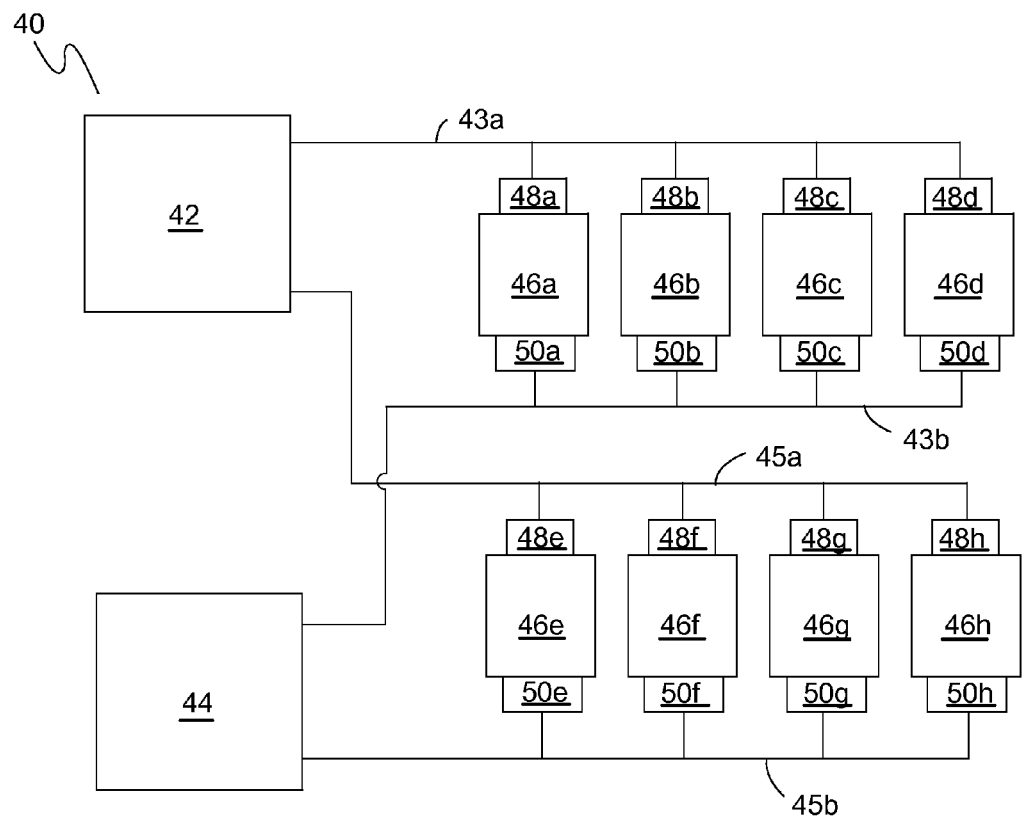
FIG. 2 is a block diagram of a multi-string redundant RS-485 network of the prior art.
Figure 3:
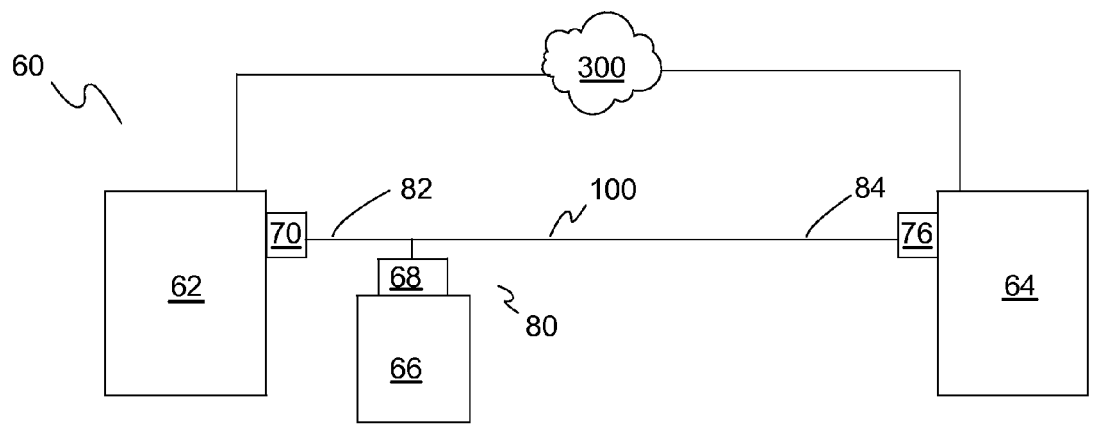
FIG. 3 is a block diagram of one embodiment of a system of the present invention showing redundancy for a single serial string.

The preferred embodiments of the present invention are illustrated in FIGS. 3-11. FIG. 3 shows a basic embodiment of a redundant wrap-around network system 60. System 60 has a first data source device 62, a second data source device 64, a serial string 80 with at least one endpoint device 66, and a common data source device 300. In one embodiment, first data source device 62 has a primary interface 70 that is constructed and arranged initially as a master communication source for serial string 80. Second data source device 64 has a secondary interface 76 that is constructed and arranged to monitor messages transmitted by primary interface 70 and take over as the master communication source if secondary interface 76 does not detect messages from primary interface 70 after a predetermined amount of time.

Serial string 80 includes a backbone 100, which is a signal bus that is electrically connected between primary interface 70 and secondary interface 76. Each endpoint device 66 is electrically connected to backbone via a single endpoint interface 68. Each endpoint device 66 is connected to backbone 100 in a multipoint configuration. That is, each endpoint device 66 is connected to backbone 100, forming a serial string 80 of endpoint devices 66 connected to first data source device 62 and to second data source device 64.

Common data source device 300 communicates data to first data source device 62 and to second data source device 64. Communication may be made with electrical connections to or wireless communication with first data source device 62 and second data source device 64. Common data source device 300 communicates information to data source devices 62, 64 so that data source devices 62, 64 "know" what information should be transmitted and received between first data source device 62, second data source device 64, and endpoint devices 66. The information communicated by common data source 300 to first data source device 62 and to second data source device 64 may be identical or it may be particular to each data source device 62, 64. First data source device 62 and second data source device 64 may communicate with and receive information from more than one common data source 300.

Second data source 64 is configured to "listen" for communication from first data source 62 and endpoint devices 66. If expected information is not received by second data source device 64 from either first data source device 62 and/or from endpoint device 66, for example, data source device 64 takes over as the master communication source for serial string 80. Taking over as the master communication source in some embodiments includes "asking" or determining what other devices are present in the network and transmitting a message to those devices. In some embodiments, secondary interface 76 is further configured to continue monitoring messages transmitted by primary interface 70 after secondary interface 76 takes over as the master communication source. If secondary interface 76 detects reestablished communication from primary interface 70, then secondary interface 76 relinquishes control as the master communication source for serial string 80 connected thereto.

Serial string 80 has a front end 82 and a back end 84. As shown in FIG. 3, front end 82 of serial string 80 is the portion of backbone 100 that connects between first data source device 62 and the first endpoint device 66 in serial string 80 relative to first data source device 62. Back end 84 of serial string 80 is the portion of backbone 100 connected between second data source device 64 and the last endpoint device 66 of serial string 80 relative to first data source device 62.

Backbone 100 may be any suitable differential balanced line over twisted pair cables. Preferably, backbone 100 conforms to the RS-485 or RS-422 standard. Depending on application, the connectors on these cables may be of any suitable kind (e.g., screw terminals, D-subminiature connectors, etc.).

Common data source 300 is preferably a third source that is external to or separate from first data source 62 and second data source 64 as illustrated in FIG. 3. If system 60 loses one of first data source 62 or second data source 64, the common information is not also lost. In other embodiments, common data source 300 is one of first data source 62 or second data source 64 or included therein. In such an embodiment, however, loss of the data source that includes common data source results in loss of the common data as well. Thus, the system is less robust.

Figure 4:
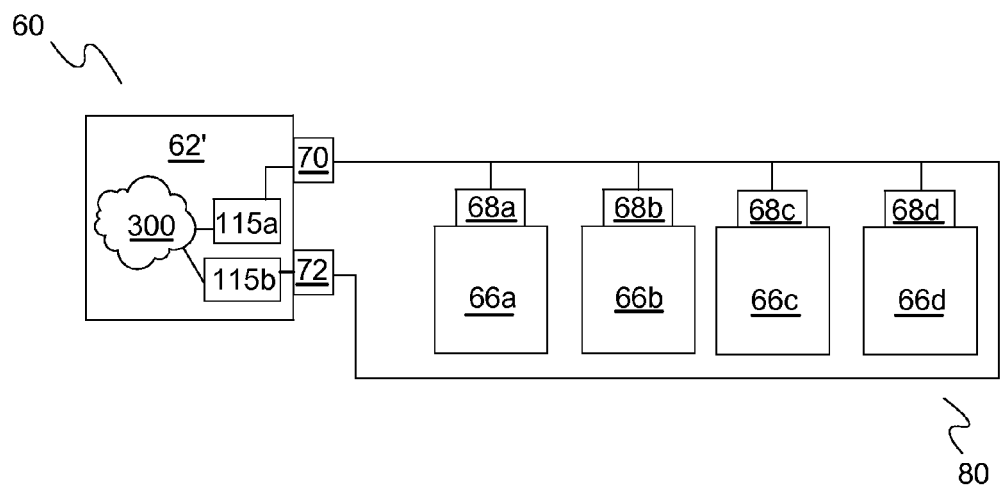
FIG. 4 is a block diagram of another embodiment of a system of the present invention showing redundancy for a single serial string using one data source device having multiple transmitters.

Referring now to FIG. 4, there is illustrated an embodiment of redundant wrap-around network system 60 having a single data source device 62' with multiple transmitters 115. In this embodiment, data source device 62' has primary interface 70 transmitting data from first transmitter 115a. Secondary interface 72 transmits data from second transmitter 115b. As above, primary interface 70 is constructed and arranged initially as a master communication source for serial string 80, which has endpoint devices 66a-66d with endpoint interfaces 68a-68d, respectively. Secondary interface 72 is constructed and arranged to monitor messages transmitted by primary interface 70 and to take over as the master communication source if secondary interface 72 does not detect messages from primary interface 70 after a predetermined amount of time. In this embodiment, common data source device 300 may be integral with or external to data source device 62'. Common data source device 300 communicates with both first transmitter 115a and second transmitter 115b as described above regarding the embodiment illustrated in FIG. 3.

Figure 5:
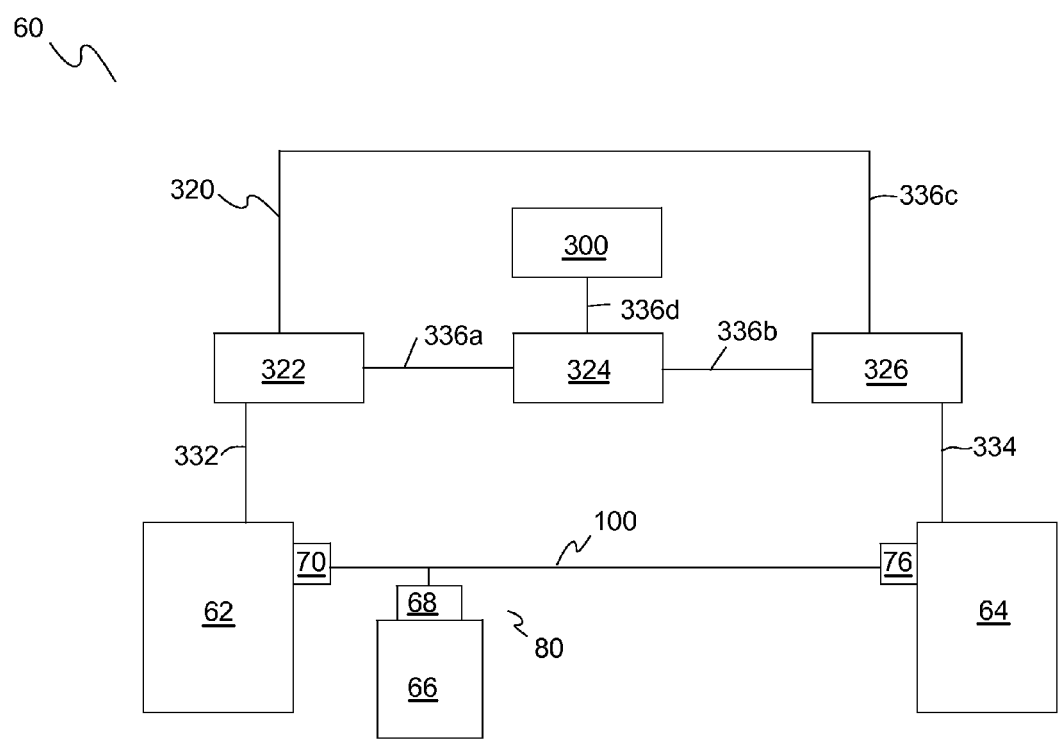
FIG. 5 is a block diagram of an embodiment of a system of the present invention showing an Ethernet ring network.

Referring now to FIG. 5, there is illustrated an embodiment of system 60 where common data source 300 is part of an Ethernet ring network 320 having a first network switch 322, a second network switch 324, and a third network switch 326. First network switch 322 connects to first data source device 62 with an Ethernet downlink 332 and connects to second network switch 324 with an Ethernet cable 336a. Third network switch 326 connects to second data source device 64 with an Ethernet downlink 334 and to second network switch 324 by an Ethernet cable 336c. First network switch 322 connects to third network switch 326 with Ethernet cable 336c. Common data source 300 connects to second network switch 324 with Ethernet cable 336d. Thus, first network switch 322, second network switch 324 and third network switch 326 form a ring or loop with common data source 300 connected to second network switch 324.

In the embodiment illustrated in FIG. 5, loss of first data source 62 or second data source 64 does not result in loss of common data source 300. Here, for example, loss of first network switch 322 would initially result in loss of communication from common data source 300 to first network switch 322 and therefore to endpoint device 66. Upon sensing this loss of communication, communication is restored when common data source 300 re-routes communication through third network switch 326 to second data source device 64 and therefore to endpoint device 66. This embodiment is more robust because it requires at least two failures for communication to be lost to endpoint device 66 from common data source 300.

Figure 6:
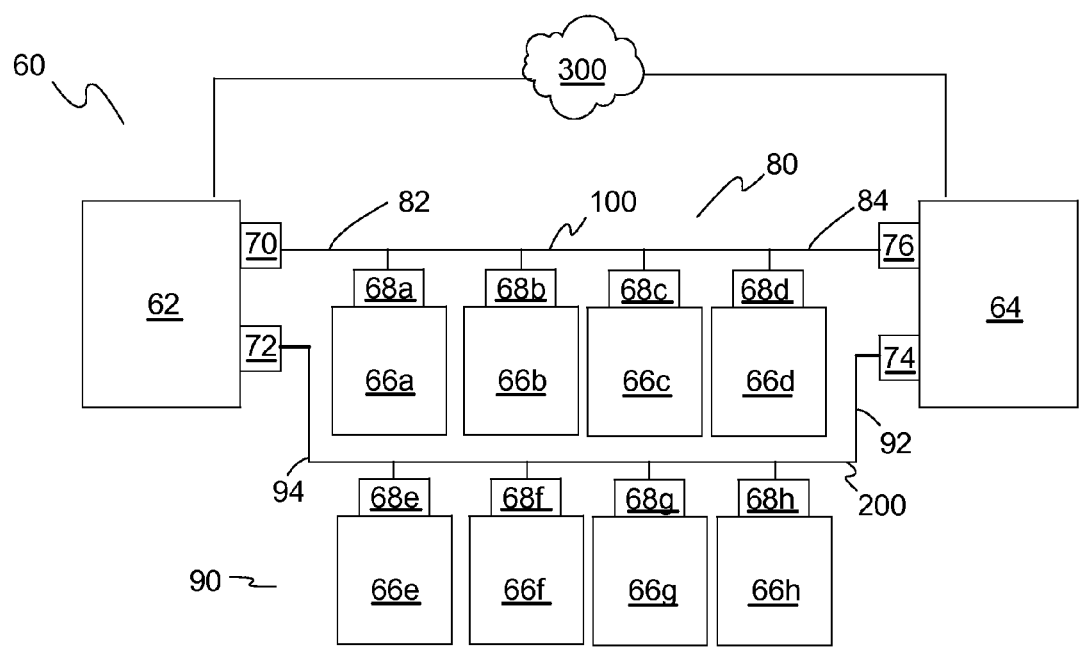
FIG. 6 is a block diagram of another embodiment of a system of the present invention showing redundancy for multiple serial strings.

Referring now to FIG. 6, there is illustrated an embodiment of redundant wrap-around network system 60 with serial strings 80, 90. In this embodiment, system 60 has at least two serial strings 80, 90 connected between first data source device 62 and second data source device 64. System 60 optionally includes common data source device 300 as described above regarding the embodiment illustrated in FIG. 3. Because the embodiment illustrated in FIG. 6 has at least two serial strings, common data source device 300 may not be necessary since one of serial strings 80, 90 may serve as the common data source device 300, or command device, for first data source device 62 and second data source device 64.

First data source device 62 has primary interface 70 (e.g., a first channel) and a secondary interface 72 (e.g., a second channel). Second data source device 64 similarly has a primary interface 74 and secondary interface 76. Primary interface 70 of first data source device 62 is electrically connected to secondary interface 76 of second data source device by backbone 100. Primary interface of second data source device 64 is electrically connected to secondary interface of first data source device by additional or second backbone 200. At least one endpoint device 66 connects to each of backbones 100, 200 via an endpoint interface 68.

As shown in FIG. 6, endpoint devices 66a-66d connect to first backbone 100 via endpoint interfaces 68a-68d, respectively, in a multipoint configuration. Endpoint devices 66a-66d form part of first serial string 80 with backbone 100. Similarly, each of endpoint devices 66e-66h connect to second backbone 200 via endpoint interfaces 68e-68h, respectively, in a multipoint configuration. Endpoint devices 66e-66h form part of additional or second serial string 90 with second backbone 200. Endpoint devices may alternately connect to backbones 100, 200 in multipoint configuration. More of fewer endpoint devices 66 may be present on each serial string 80, 90.

As noted above, backbone 100 and second backbone 200 may be any suitable differential balanced line over twisted pair cables. Preferably, backbone 100 and second backbone 200 conform to the RS-485 or RS-422 standard. Depending on the application of system 60, the connectors on these cables may be of any suitable kind (e.g., screw terminals, D-subminiature connectors, etc.).

First data source device 62 connects to a front end 82 of first string 80 of endpoint devices 66a-66d via first primary interface 70. Second data source device 64 connects via secondary interface 76 to back end 84 of first serial string 80 of endpoint devices 66a-66d. Each individual endpoint device 66a-66d connects to first serial backbone 100 of first string 80 (and consequently to both the first data source device 62 and the second data source device 64) via the corresponding endpoint interface 68a-68d of endpoint devices 66a-66d, respectively. To eliminate connectivity errors, each endpoint device 66 preferably has no more than one endpoint interface 68.

Similarly, second data source device 64 connects via primary interface 74 to a front end 92 of second serial string 90 of endpoint devices 66e-66h via primary interface 74 of second data source device 64. Front end 92 is the portion of second backbone 200 that connects between primary interface 74 of second data source device 64 and endpoint interface 68h of endpoint device 66h, the first endpoint device in the second serial string 90 relative to second data source device 64. First data source device 62 connects via secondary interface 72 to a back end 94 of second serial string 90 of endpoint devices 66e-66h. Each individual endpoint device 66e-66h connects to second backbone 200 of second string 90 (and consequently to both first data source device 62 and second data source device 64) via the corresponding endpoint interface 68e-68h of endpoint devices 66e-66h, respectively. As similar with first string 80, to eliminate connectivity errors, each endpoint device 66e-66h of second string 90 preferably has no more than one endpoint interface 68.

In the embodiment of system 60 shown in FIG. 6, secondary interface 72 of first data source device 62 may instead be configured as a primary interface and primary interface 74 of second data source device 64 may instead be configured as a secondary interface. Thus, the primary interface of a given serial string may be assigned to either first data source device 62 or second data source device 64, where the secondary interface is assigned to the other data source device. Accordingly, for various embodiments of system 60 as illustrated in FIGS. 3-9, interfaces of first data source device 62 (or second data source device 64) may be configured as all primary, all secondary, or a mixture of both primary and secondary interfaces provided that the interface at one end of a given serial string is not configured with the same priority as the interface at the opposite end of the given serial string.

Figure 7:
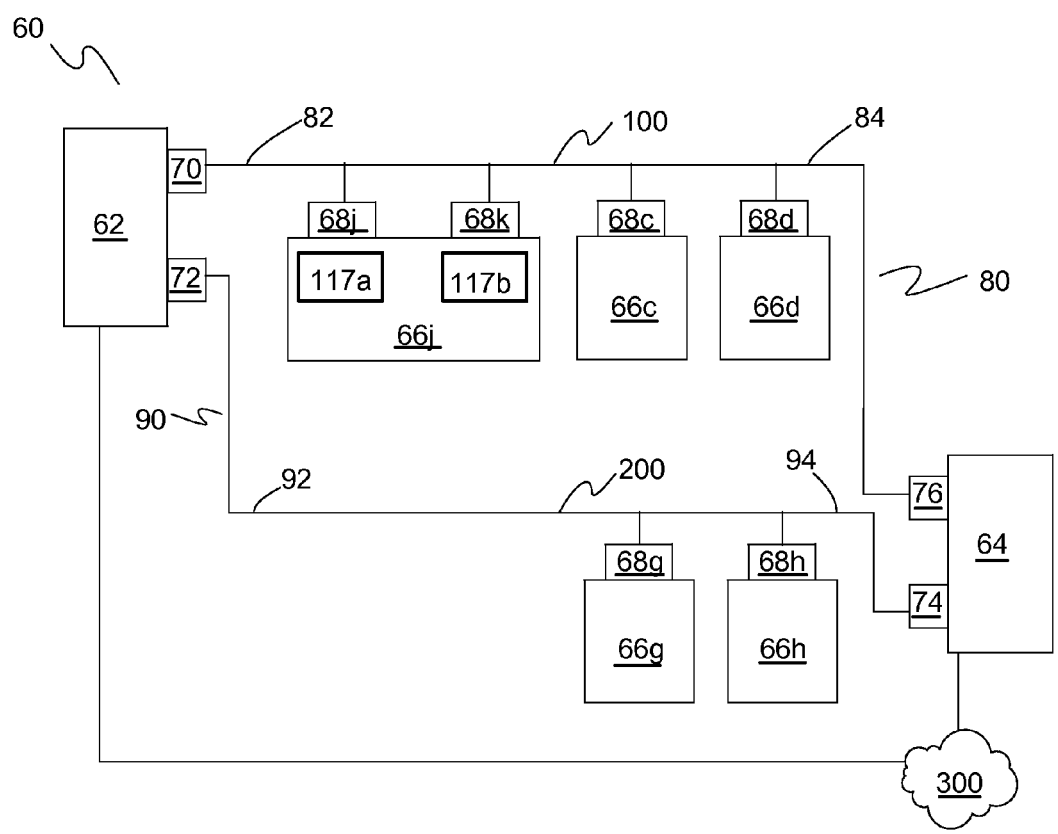
FIG. 7 is a block diagram of another embodiment of a system of the present invention showing redundancy for a serial string having an endpoint device with multiple transmitters.

Referring now to FIG. 7, there is illustrated an embodiment of system 60, in which one or more of endpoint devices 66 has multiple transmitters 117. Here, for example, endpoint device 66j has first transmitter 117a and second transmitter 117b. Similar to the embodiment illustrated in FIG. 6, this embodiment of system 60 has first data source device 62, second data source device 64, first serial string 80 of endpoint devices 66, second serial string 90 of endpoint devices 66, and common data source device 300. First data source device 62 has interfaces 70, 72; second data source device has interfaces 76, 74.

In this example, transmitters 117a, 117b of endpoint device 66j each have a separate endpoint interface 68j, 68k, respectively. Transmitters 117a, 117b each communicates independently with first data source device 62 and/or second data source device 64 via endpoint interfaces 68j, 68k, respectively. Endpoint device 66j therefore is configured to have internal redundancy in that each transmitter 117a, 117b transmits the identical (or at least partially identical) data from endpoint device 66j.

While example embodiments of system 60 illustrated in FIGS. 6 and 7 have two serial strings 80, 90 where each serial string 80, 90 has multiple endpoint devices 66, other arrangements are possible. Depending on the application, system 60 may have more or fewer than two serial strings and each serial string may have more or fewer endpoint devices 66. For example, a five story office building may have the need for endpoint devices 66 on each of floors one through five. Floors one through three each have, for example, fifteen endpoint devices 66 and floors four and five each have twenty endpoint devices 66. A network designer may decide to separate endpoint devices 66 on each floor into separate strings in order to optimize the use of cabling and other hardware.

In this example, the use of five strings would require five sets of primary and secondary interfaces distributed among data source devices 62, 64. Since system 60 as illustrated in FIG. 6 already includes two primary interfaces 70, 74 and two secondary interfaces 72, 76, one on each of first data source device 62 and second data source device 64, three additional interface sets would be needed. This could be accommodated, for example, by placing two additional primary interfaces and one additional secondary interface on first data source device 62 and by placing one additional primary interface and two additional secondary interfaces on second data source device 64. This could alternatively be accommodated, for example, by incorporating one or more additional data source device and distributing the additional sets of primary and secondary interfaces between the additional data source devices.

Figure 8:
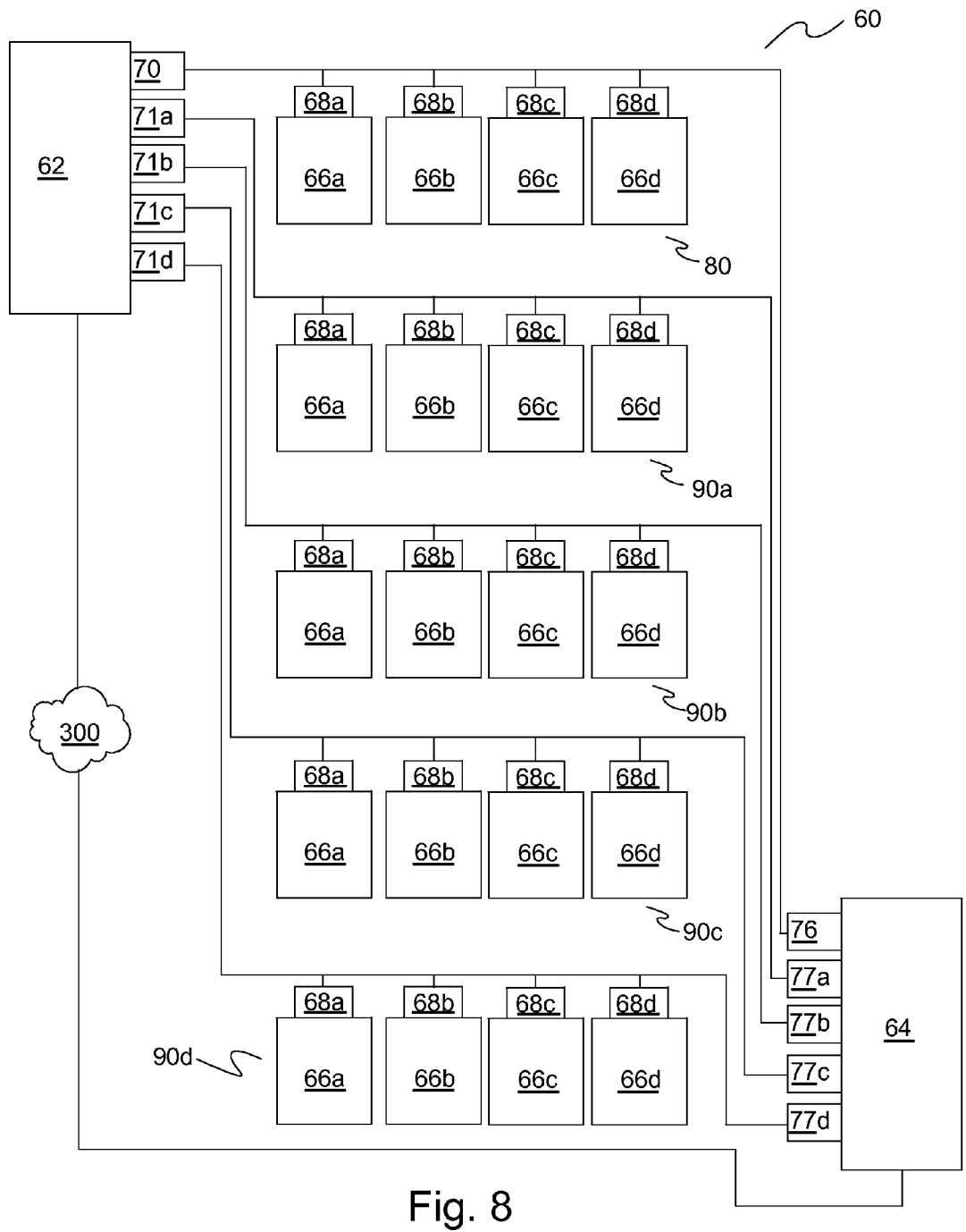
FIG. 8 is a block diagram of another embodiment of a system of the present invention showing redundancy for multiple serial strings.

Referring now to FIG. 8 there is illustrated an example embodiment of system 60 having a plurality of (e.g., five) serial strings 80, 90a-90d connected between first data source device 62 and second data source device 64. As shown in FIG. 8, system 60 has first serial string 80 and four additional serial strings 90a-90d. First data source device 62 has primary interface 70 that is constructed and arranged initially as a master communication source for first serial string 80. First data source device 62 also has additional interfaces 71a-71d, each configured either as primary or secondary. Second data source device 64 has secondary interface 76 and four additional interfaces 77a-77d that are each configured as either primary or secondary, depending on the configuration of the corresponding additional interface 71a-71d at the opposite end of the respective serial string. As noted above, each serial string connects to a primary interface and to a secondary interface. Thus, for example, if additional interface 71a is configured as a primary interface, then additional interface 77a is configured as a secondary interface.

Figure 9:
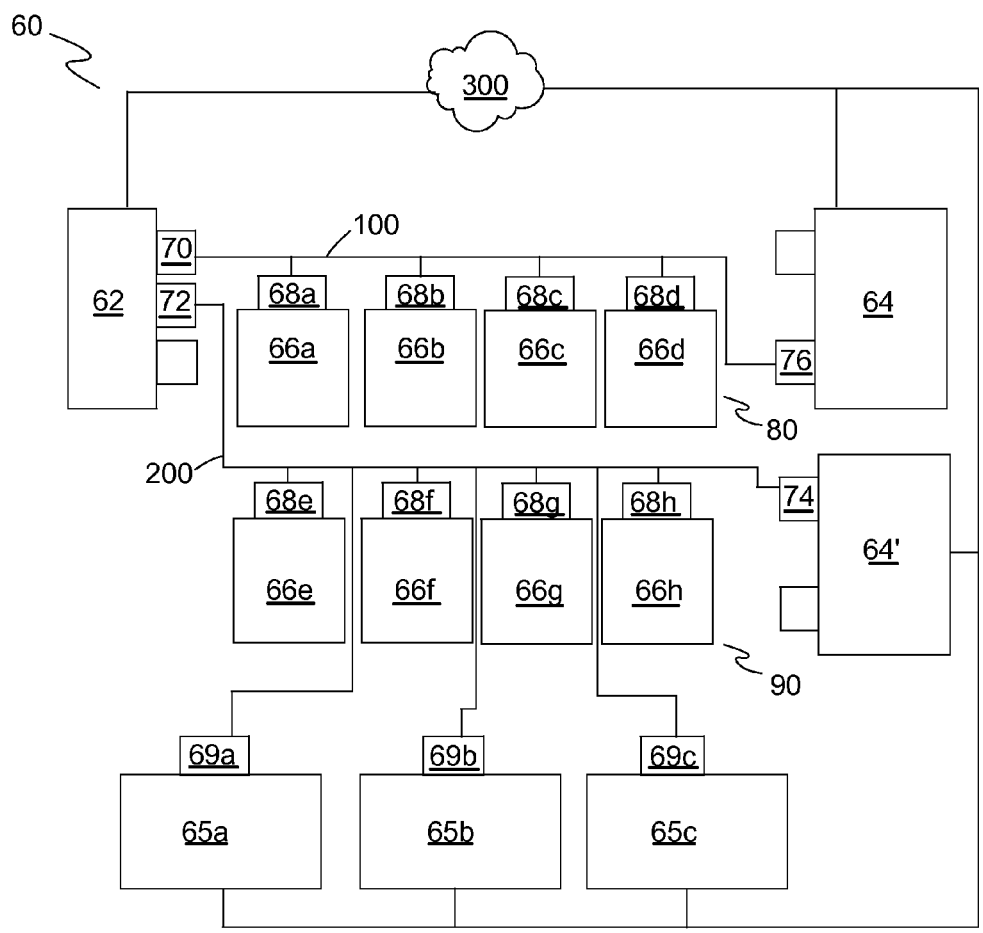
FIG. 9 is a block diagram of another embodiment of system of the present invention showing redundancy for multiple serial strings and using additional data source devices.

Referring now to FIG. 9, there is illustrated an embodiment of system 60 having additional data source devices 64', 65a-65c. In this embodiment, system 60 has first data source device 62, second data source device 64, one or more additional data source device 64', and common data source device 300. One or more of serial strings 80, 90 optionally also has one or more further additional data source device 65a-65c. Common data source device 300 communicates with each data source device 62, 64, 64', 65a-65c.

First serial string 80 connects between primary interface 70 of first data source device 62 and secondary data source device 76 of secondary data source device. Secondary data source device 76 takes over as the master communication source for serial string 80 should second data source device 64 fail to receive communication from endpoint devices 66a-66d and/or first data source device 62 within a predetermined amount of time. Thus, redundancy of data communicated to/from first data source device 62 on backbone 100 is provided by second data source device 64.

Similarly, second serial string 90 connects between primary interface 74 of second data source device 64 and secondary interface 72 of first data source device 62. Secondary interface 72 of first data source device 62 takes over as the master communication source for second serial string 90 should first data source device 62 fail to receive communication from endpoint devices 66e-66h and/or second data source device 64 within a predetermined amount of time. Thus, redundancy of data communicated to/from second data source device 64 on second backbone 200 is provided by first data source device 62. (As noted above, the priority of interfaces 72, 74 may be reversed where interface 72 is a primary interface and interface 74 is a secondary interface and redundancy is provided by first data source device 62.)

In addition to the redundancy provided by first data source device 62 for second serial string 90, for example, one or more further additional data source devices 65 may be connected to backbone 200. As illustrated in FIG. 9, for example, system 60 has further additional data source devices 65a, 65b, 65c with interfaces 69a, 69b, 69c, respectively. Each of interface 69a, 69b, 69c of further additional data source devices 65a, 65b, 65c, respectively, are configured as secondary interfaces that listen for data communicated along backbone 200. If any of further additional data source devices 65a, 65b, 65c fail to receive data transmitted on backbone 200, due to a break in second backbone 200, for example, each of further additional data source devices 65a, 65b, 65c is configured to take over as the master communication source for second serial string 90.

As an example, if second backbone 200 failed on both sides of endpoint devices 66f and 66g, therefore cutting off communication from endpoint devices 66f, 66g to either first data source device 62 or additional data source device 64', one or more of further additional data source devices 65a, 65b, 65c is configured to take over as the master communication source for these endpoint devices 66f, 66g. If more than one further additional data source device 65a, 65b, 65c is able to take over as the master communication source, the first further additional data source device 65a, 65b, 65c to do so would become the master communication source.

In the various embodiments of system 60, an additional or second data source device is configured to take over as the master communication source after a predetermined amount of time elapses without receiving or detecting a signal. The predetermined amount of time is a function of the type of the distribution and control implemented by system 60. When system 60 requires real-time control of endpoint devices 66, the predetermined amount of time is set where a secondary data source device takes over as soon as possible. In another system 60, such as control of lighting, where a single "on" or "off" signal changes the state of the lighting to either on or off, the predetermined amount of time may be set to allow for a reasonable or acceptable delay in the lighting to respond to the change-of-state command.

Figure 10:
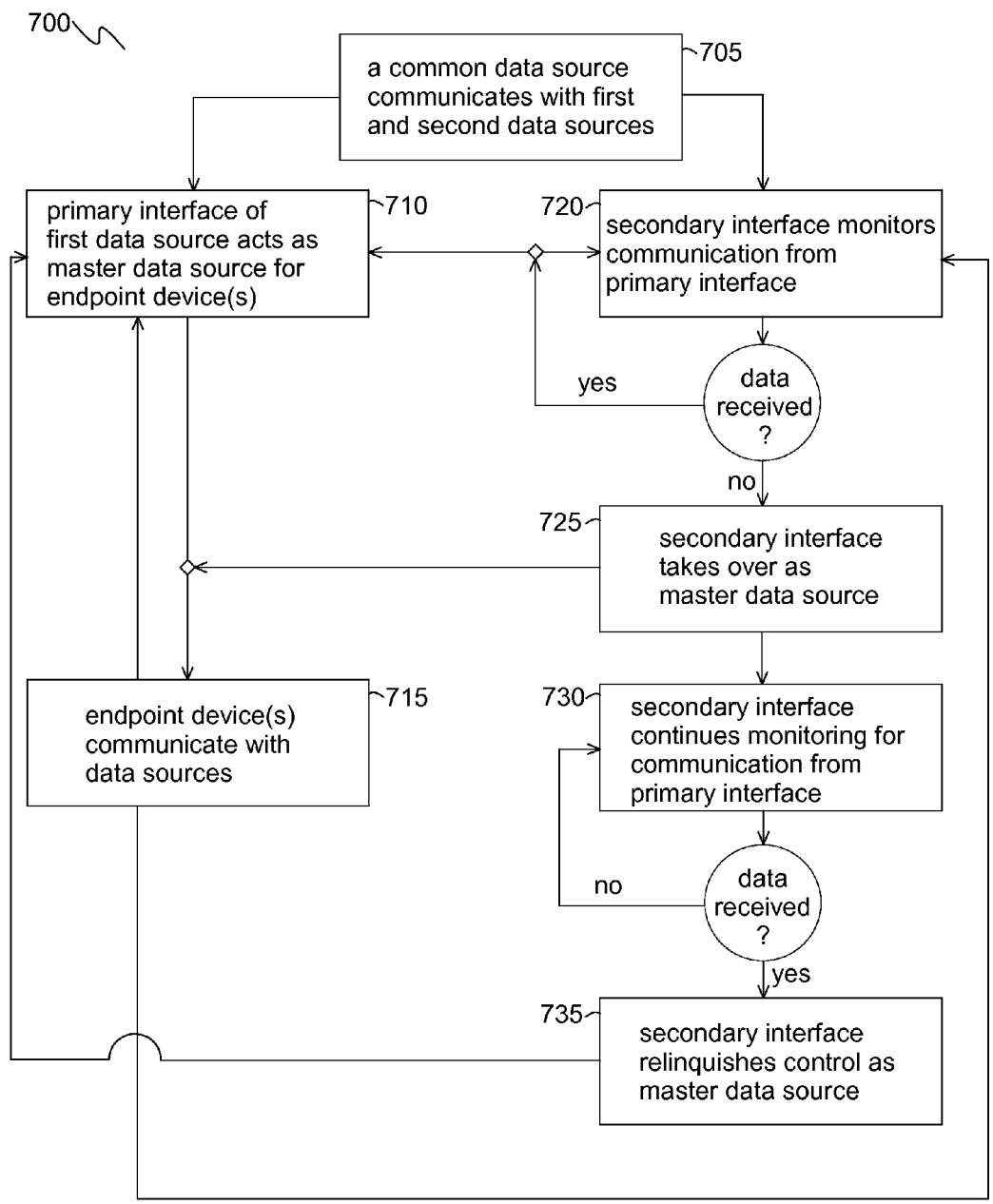
FIG. 10 is a flow diagram showing steps of various embodiments of a method of network redundancy of the present invention.

FIG. 10 illustrates the steps of various embodiments of a method 700 of network redundancy. In step 705, a common data source communicates with first and second data sources. In step 710, a primary interface of the first data source acts as the master communication source for one or more endpoint devices. In step 715, each endpoint device communicates with the data sources.

In step 720, a secondary interface of another data source monitors communication from the primary interface. If communication from the primary interface is received or detected by the secondary interface as expected, the secondary interface continues monitoring communications. If communication is not received or detected by the secondary interface as expected, the secondary interface in step 725 takes over as the master data source.

Another embodiment of method 700 also includes steps 730 and 735 after the secondary interface has taken over as the master data source. In step 730, the secondary interface continues to monitor communication from the primary interface. If communication from the primary interface has been reestablished, the secondary interface in step 735 relinquishes control as the master data source. If communication has not been reestablished, the secondary interface continues to monitor communication from the primary interface for reestablished communication.

Figure 11:
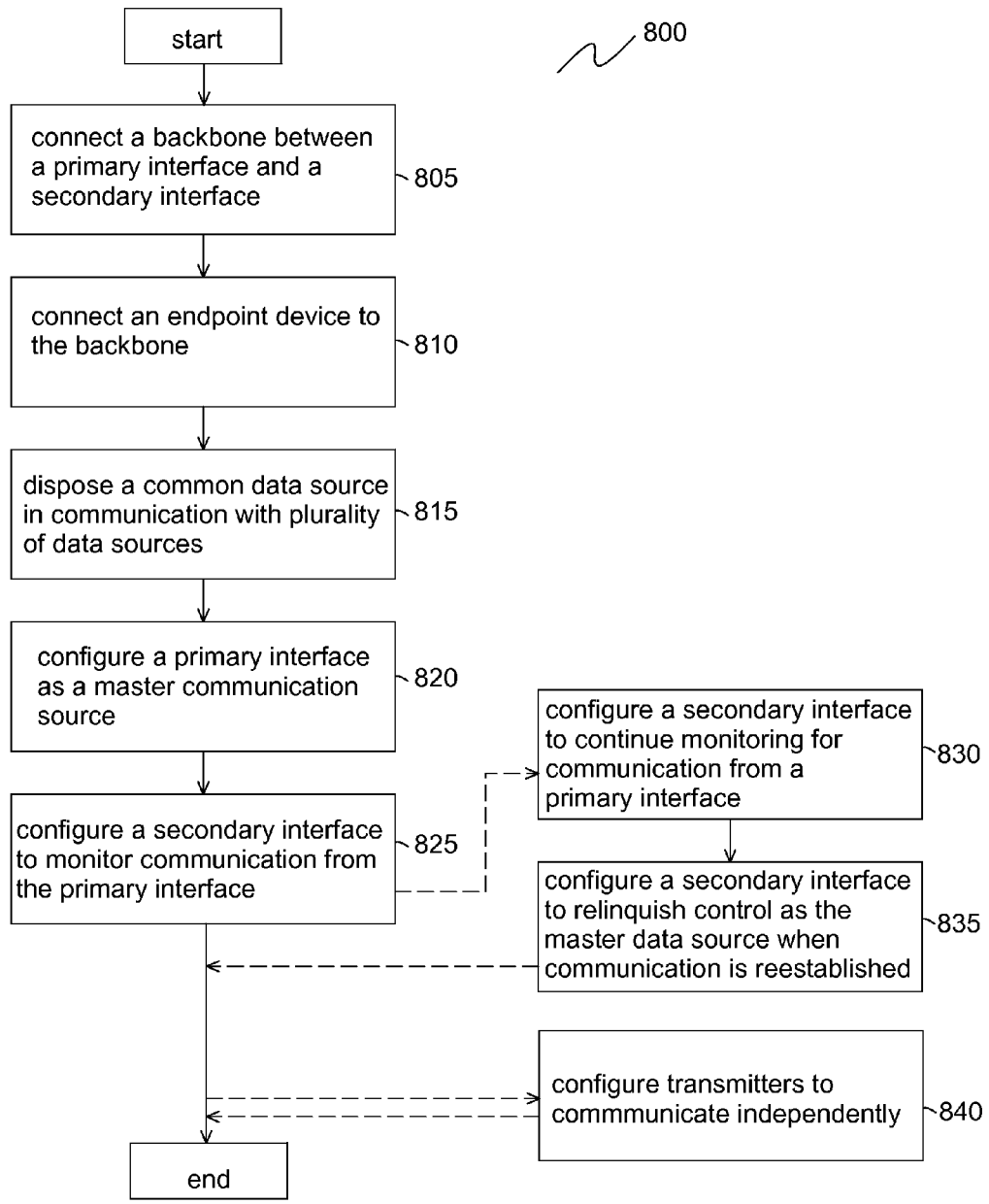
FIG. 11 is a flow diagram showing steps of various embodiments of a method of configuring network redundancy of the present invention.

FIG. 11 illustrates the steps of various embodiments of a method 800 of configuring a network with serial redundancy. Steps of method 800 do not have to be performed in the order shown and the sequence of FIG. 11 is merely illustrative. In step 805, a serial backbone is connected to a primary interface of a first data source device and to a secondary interface of a second data source device. In step 810, at least one endpoint device is connected to the backbone via an endpoint interface, forming a serial string of endpoint devices. In step 815, a common data source device is disposed in communication with the first data source device and with the second data source device. In step 820, the primary interface is configured to initially act as a master communication source for the serial string of endpoint devices. In step 825, a secondary interface is configured to monitor messages transmitted by primary interface and to take over as the master communication source for the serial string of endpoint devices connected thereto if the secondary interface does not detect messages from the primary interface after a predetermined amount of time.

Another embodiment of method 800 optionally includes steps 830 and 835. In step 830, the secondary interface is configured to continue monitoring messages transmitted by the primary interface after the secondary interface takes over as the master communication source. In step 835, the secondary interface is configured to relinquish control as the master communication source for the serial string connected thereto if the secondary interface detects reestablished communication from the primary interface.

Method 800 can be modified to include configuring additional data sources and additional serial strings of endpoint devices. In one embodiment of method 800, step 805 is performed where the first data source device is connected to a front end of the backbone. In another embodiment of method 800, step 805 is performed where the second data source device is connected to a back end of the backbone. In another embodiment of method 800, the backbone is either a half-duplex serial backbone or a full-duplex serial backbone. In another embodiment of method 800, step 810 of connecting at least one endpoint device is performed by connecting the endpoint device(s) in a multi-drop or a multipoint configuration to the additional serial backbone.

In another embodiment of method 800, at least one of the endpoint devices has multiple transmitters. Method 800 optionally includes step 840 of configuring each transmitter of a single endpoint device to communicate independently with the first data source device, the second data source device, and/or any additional data source device(s).

In another embodiment of method 800, the step 810 of connecting at least one endpoint device is performed by electrically connecting the endpoint device(s) by a single endpoint interface to the backbone. In another embodiment of method 800, the primary interface and secondary interface connected to a serial string of endpoint devices are both in compliance with the RS-485 technical standard or the RS-422 technical standard.

In use, embodiments of system 60 provide redundancy for data source device information to endpoint devices 66. Primary interface 70 of first data source device 62 acts as the master communication source for first serial string 80 of endpoint devices 66. Primary interface 70 is assigned priority by first data source device 62 to act as a master communication source over secondary interface 76 of second data source device 64, which acts as a slave and listens for messages transmitted by primary interface 70 of first data source device 62. If a certain predetermined amount of time (e.g., a minute) elapses during which secondary interface 76 does not detect any messages from primary interface 70, secondary interface 76 takes over as the master communication source for first serial string 80 of endpoint devices 66. After taking over as the master communication source, secondary interface 76 continues to listen for messages transmitted by primary interface 70 of first data source device 62. As soon as primary communication is restored (i.e., secondary interface 76 detects a message from primary interface 70), secondary interface 76 ceases acting as the master communication source for first serial string 80 of endpoint devices 66 and continues to monitor messages from primary interface 70.

Similarly, primary interface 74 of second data source device 64 acts as the master communication source for second serial string 90 of endpoint devices 66. Secondary interface 72 of first data source device 62 listens for messages transmitted by primary interface 74 of second data source device 64. If a certain predetermined amount of time (e.g., a minute) elapses during which secondary interface 72 does not detect any messages from primary interface 74, secondary interface 72 of first data source device 62 takes over as the master communication source for second string 90 of endpoint devices 66. After taking over as the master communication source, secondary interface 72 of first data source device 62 continues to listen for messages transmitted by primary interface 74 of second data source device 64. As soon as primary communication is restored (i.e., secondary interface 72 detects a message from primary interface 74), secondary interface 72 ceases acting as the master communication source for second serial string 90 of endpoint devices 66 and continues to monitor messages from primary interface 74 of second data source device.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims. For example while the invention has been described with reference to RS-485 network topologies, the above described architecture may also be suitable for similar or derivative communication standards.

I claim:

1. A network system comprising:
   a first data source device having a primary interface;
   one or more second data source device(s) disposed in electrical communication with the first data source device and having a secondary interface;
   a common data source device disposed in communication with the first data source device and the one or more second data source device; and
   a serial string comprising:
      a backbone electrically connected to the primary interface of the first data source device and to the secondary interface of one of the one or more second data source device(s);
      a plurality of endpoint devices each electrically connected to the backbone via an endpoint interface;
   wherein the primary interface is constructed and arranged initially as a master communication source for the serial string connected thereto;
   wherein the secondary interface connected to the backbone is constructed and arranged to monitor messages transmitted by the primary interface and to take over as the master communication source for one or more of the plurality of endpoint devices of the serial string connected thereto if the secondary interface does not detect messages from the primary interface after a predetermined amount of time, thereby configuring the network system in which the secondary data source is the master data source for the one or more of the plurality of endpoint devices of the serial string and the first data source continues as the master communication source for remaining ones of the plurality of endpoint devices;
   wherein the predetermined amount of time is assigned based on a time required for the secondary data source to take over as the master communication source for one or more of the plurality of endpoint devices of the serial string; and
   wherein the network system complies with RS-422 protocol in that one and only one master communication source communicates at one time with any of the plurality of endpoint devices.

2. The network system of claim 1, wherein the secondary interface is further configured to continue monitoring messages transmitted by the primary interface after the secondary interface takes over as the master communication source, and if the secondary interface detects reestablished communication from the primary interface, then the secondary interface relinquishes control as the master communication source for the one or more of the plurality of endpoint devices of the serial string.

3. The network system of claim 1, further comprising:
   an additional primary interface on one of the first data source device and the second data source device;
   an additional secondary interface on one of the first data source device and the second data source device;
   an additional serial string comprising:
      an additional backbone electrically connected to the additional primary interface and to the additional secondary interface; and
      a plurality of additional endpoint devices electrically connected to the additional backbone via an endpoint interface;
   wherein the additional primary interface is constructed and arranged initially as a master communication source for the additional serial string; and
   wherein the additional secondary interface is constructed and arranged to monitor messages transmitted by the additional primary interface and to take over as the master communication source for the additional serial string if the additional secondary interface does not detect messages from the additional primary interface after a predetermined amount of time, thereby configuring the network system in which the additional secondary interface is the master data source for the one or more of the plurality of additional endpoint devices and the additional primary interface continues as the master communication source for remaining ones of the plurality of additional endpoint devices.

4. The network system of claim 1, wherein the first data source device is electrically connected to a front end of the at least one serial string.

5. The network system of claim 1, wherein the at least one second data source device is electrically connected to a back end of the at least one serial string.

6. The network system of claim 1, wherein the backbone is either a half-duplex serial backbone or a full-duplex serial backbone.

7. The network system of claim 1, wherein the plurality of endpoint devices are connected to the backbone in one of a multi-drop configuration and a multipoint configuration.

8. The network system of claim 1, wherein at least one of the plurality of endpoint devices has a plurality of transmitters, each one of the plurality of transmitters being configured to communicate independently with the first data source device and with the second data source device.

9. The network system of claim 1, wherein each of the plurality of endpoint devices is electrically connected by a single endpoint interface to the backbone.

10. A network redundancy system comprising:
    a first data source device having a first primary RS-485 interface and a first secondary RS-485 interface;

a second data source device disposed in electrical communication with the first data source device, the second data source device having a second primary RS-485 interface and a second secondary RS-485 interface;
a first serial string comprising:
  a first serial backbone connected to the first primary RS-485 interface and to the second secondary RS-485 interface; and
  a plurality of first endpoint devices connected to the first serial backbone in a multipoint orientation; and
a second serial string comprising:
  a second serial backbone connected between the second primary RS-485 interface and the first secondary RS-485 interface; and
  a plurality of second endpoint devices connected to the second serial backbone in a multipoint orientation;
wherein the first primary RS-485 interface is constructed and arranged initially as a master communication source for the first serial string, and the second primary RS-485 interface is constructed and arranged initially as a master communication source for the second serial string;
wherein the first secondary RS-485 interface is constructed and arranged to monitor messages transmitted by the second primary RS-485 interface and take over as the master communication source for one or more of the plurality of second endpoint devices of the second serial string if the first secondary RS-485 interface does not detect messages from the second primary RS-485 interface after a predetermined amount of time, thereby providing a configuration in which the first secondary interface is the master data source for the one or more of the plurality of second endpoint devices of the second serial string and the first data source continues as the master communication source for remaining ones of the plurality of second endpoint devices of the second serial string;
wherein the predetermined amount of time is assigned based on a time required for the first secondary RS-485 interface to take over as the master communication source for one or more of the plurality of second endpoint devices of the second serial string; and
wherein the second secondary RS-485 interface is constructed and arranged to monitor messages transmitted by the first primary RS-485 interface and to take over as the master communication source for one or more of the plurality of first endpoint devices of the first serial string if the second secondary RS-485 interface does not detect messages from the first primary RS-485 interface after a predetermined amount of time, thereby providing a configuration in which the second secondary data source is the master data source for the one or more of the plurality of first endpoint devices of the first serial string and the first primary RS-485 interface continues as the master communication source for remaining ones of the plurality of first endpoint devices of the first serial string;
wherein the predetermined amount of time is assigned based on a time required for the second secondary RS-485 interface to take over as the master communication source for one or more of the plurality of first endpoint devices of the first serial string; and
wherein the network system complies with a RS-485 protocol in that one and only one master communication source communicates at one time with any of the plurality of endpoint devices.

11. A method of configuring network redundancy comprising the steps of:

connecting a serial backbone to a primary interface of a first data source device and a secondary interface of a second data source device;
connecting a plurality of endpoint devices to the serial backbone via an endpoint interface, thereby forming a serial string of endpoint devices;
disposing a common data source device in communication with the first data source device and the second data source device;
configuring the primary interface to act initially as a master communication source for the serial string of endpoint devices; and
configuring the secondary interface to monitor messages transmitted by the primary interface;
detecting a communication failure between the first data source device and one or more of the plurality of end point devices based on not detecting messages from the primary interface after a predetermined amount of time; and
configuring the second data source device to take over as the master communication source for one or more of the plurality of endpoint devices, thereby providing a configuration in which the second data source device is the master communication source for the one or more of the plurality of endpoint devices of the serial string wherein the first data source device continues as the master communication source for remaining ones of the plurality of end point devices;
wherein the predetermined amount of time is assigned based on a time required for the second data source device to take over as the master communication source for one or more of the plurality of endpoint devices of the serial string of endpoint devices; and
wherein the method of configuration complies with RS-422 protocol in that one and only one master communication source communicates at one time with any of the plurality of endpoint devices.

12. The method of claim 11, further comprising the step of:
configuring the secondary interface to continue monitoring messages transmitted by the primary interface after the secondary interface takes over as the master communication source; and
configuring the secondary interface to relinquish control as the master communication source for the one or more of the plurality of endpoint devices if the secondary interface detects reestablished communication from the primary interface to the one or more of the plurality of endpoint devices.

13. The method of claim 11, further comprising the steps of:
connecting an additional serial backbone to an additional primary interface and to an additional secondary interface, wherein the additional primary interface is on either of the first data source device or the second data source device, and the additional secondary interface is the other of the first data source device or the second data source device;
connecting a plurality of additional endpoint devices to the additional serial backbone via an endpoint interface, forming an additional serial string of endpoint devices;
configuring the additional primary interface to initially act as a master communication source for the additional serial string of endpoint devices; and
configuring the additional secondary interface to monitor messages transmitted by the additional primary interface and to take over as the master communication source for one or more of the plurality of additional endpoint devices if the additional secondary interface does not detect messages from the primary interface after a predetermined amount of time, thereby providing a configuration in which the additional secondary interface is as the master data source for the one or more of the plurality of endpoint devices, wherein the primary interface continues as the master communication source for remaining ones of the plurality of endpoint devices.

14. The method of claim 11, wherein the first data source device is connected to a front end of the serial backbone.

15. The method of claim 11, wherein the second data source device is connected to a back end of the serial backbone.

16. The method of claim 11, wherein the serial backbone is either a half-duplex backbone or a full-duplex backbone.

17. The method of claim 11, wherein the step of connecting a plurality of endpoint devices is performed by connecting the at least one endpoint device using a multi-drop or a multipoint configuration to the additional serial backbone.

18. The method of claim 11, wherein at least one of the serial string of endpoint devices has a plurality of transmitters, and the method further comprises the step of:
configuring each of the plurality of transmitters to communicate independently with the first data source device and the second data source device.

19. The method of claim 11, wherein the step of connecting a plurality of endpoint devices is performed by electrically connecting the at least one endpoint device by a single endpoint interface to the serial backbone.

20. A method of network redundancy comprising the steps of:
disposing a common data source in communication with a first data source and a second data source;
the first data source communicating with a plurality of endpoint devices connected to a serial string connected between a primary interface of the first data source and a secondary interface of the second data source, thereby acting as a master data source for the plurality of endpoint devices;
the secondary interface monitoring communication from the primary interface;
the secondary interface detecting a communication failure between the first data source and one or more of the plurality of end point devices based on not receiving messages from the primary interface after a predetermined amount of time; and
the secondary interface taking over as the master data source for the one or more of the plurality of endpoint devices, thereby providing a configuration in which the second secondary interface is the master data source for the one or more of the plurality of endpoint devices, wherein the primary interface continues as the master communication source for any remaining ones of the plurality of endpoint devices of the serial string;
wherein the predetermined amount of time is assigned based on a time required for the second data source to take over as the master communication source for one or more of the plurality of endpoint devices of the serial string; and
wherein the method of network redundancy complies with RS-422 protocol in that one and only one master communication source communicates at one time with any of the plurality of endpoint devices.

21. The method of claim 20, further comprising the steps of:
the secondary interface continuing to monitor communication from the primary interface after taking over as the master data source; and
the secondary interface relinquishing control as the master data source if communication from the primary interface is reestablished.

* * * * *